United States Patent [19]

Kinoshita

[11] Patent Number: 5,802,047
[45] Date of Patent: Sep. 1, 1998

[54] INTER-LAN CONNECTING DEVICE WITH COMBINATION OF ROUTING AND SWITCHING FUNCTIONS

[75] Inventor: Hiroyuki Kinoshita, Tokyo, Japan

[73] Assignee: NEC Corporation, Tokyo, Japan

[21] Appl. No.: 658,964

[22] Filed: May 31, 1996

[30] Foreign Application Priority Data

May 31, 1995 [JP] Japan .................. 7-132489

[51] Int. Cl.⁶ .................................................. H04L 12/46
[52] U.S. Cl. .................................... 370/359; 370/402
[58] Field of Search ........................ 370/351, 357, 370/359, 362, 401, 402, 404, 405, 445, 911

[56] References Cited

U.S. PATENT DOCUMENTS 5,485,455  1/1996  Dobbins et al. ................ 370/255
5,579,308  11/1996  Humpleman ................... 370/352

*Primary Examiner*—Benedict V. Safourek
*Attorney, Agent, or Firm*—Sughrue, Mion, Zinn, Macpeak & Seas, PLLC

[57] ABSTRACT

When a host connected to physical ports carries out communication outside virtual LANs formed by grouping the physical ports, a CPU for a switch determines a MAC address of the router as a destination MAC address corresponding to logic ports grouped in the same virtual LAN including a receive port to receive a packet and writes the packet and a virtual LAN number attached thereto into a first buffer for switch-router communication. A CPU for a router writes the packet written in the first buffer for switch-router communication along with the virtual LAN number into a second buffer for switch-router communication. The CPU for the switch writes the packet written in the second buffer for switch-router communication into a third buffer for physical port transmit-receive to transmit the packet to the physical ports.

5 Claims, 9 Drawing Sheets

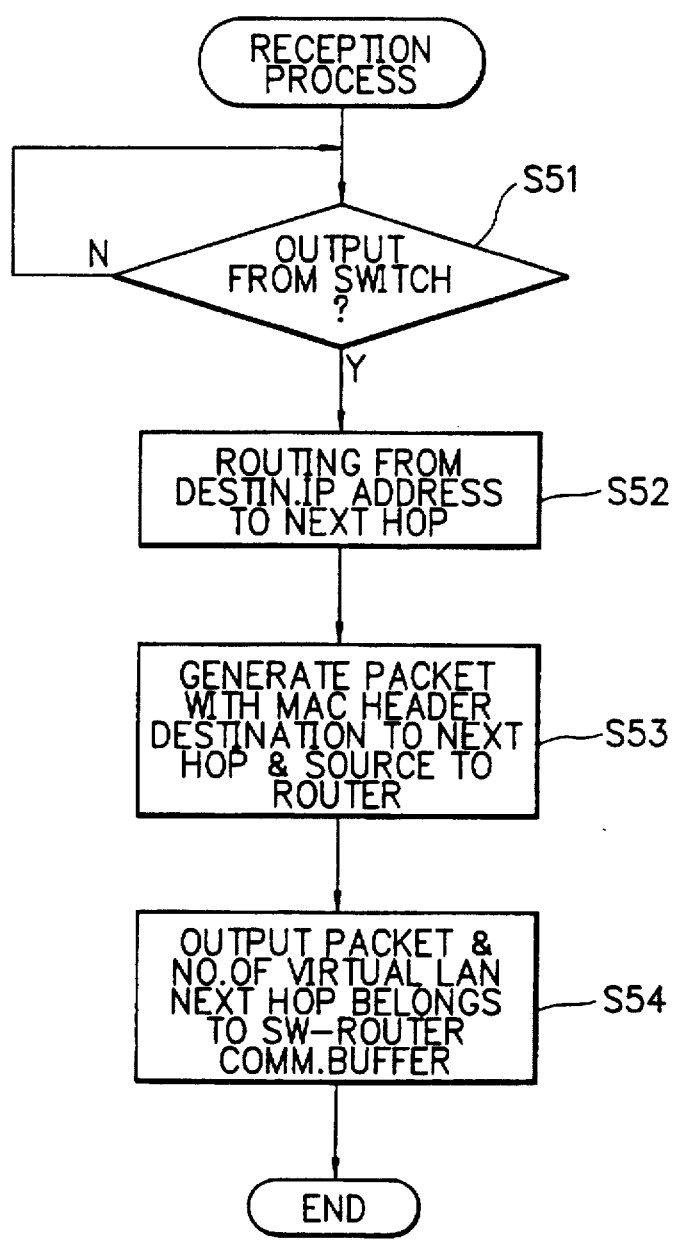

INTER-LAN CONNECTING DEVICE WITH COMBINATION OF ROUTING AND SWITCHING FUNCTIONS

BACKGROUND OF THE INVENTION

The present invention generally relates to a connecting device between local area networks (hereafter each respectively "LAN"), and particularly, to an inter-LAN connecting device with a combination of a routing function and a switching function.

DESCRIPTION OF THE RELATED ART

A conventional inter-LAN connecting device comprises a combination of a router for interconnecting a plurality of network layered LANs each respectively having a plurality of subnet layered LANs with assigned addresses, and a plurality of interfaces each respectively provided between the router and a corresponding one of the subnet LANs.

In some typical cases wherein a subnet LAN exhibits heavy Ethernet traffic that tends to have a degraded transmission rate, as shown in FIGS. 1 and 2, there are employed Ether switches (a kind of multiport bridge) or bridges 7a, 7b and 7c or 11a, 11b and 11c for limiting physical segments (collision range).

In the case of FIG. 1, a router 8 interconnects three LANs 9a, 9b and 9c of which a respective one has a corresponding bridge 7a, 7b or 7c connected between the router 8 and a plurality of unshown host apparatus such as computers.

In the case of FIG. 2, a pair of routers 10a and 10b serially connects three LANs 12a, 12b and 12c of which a respective one has a corresponding bridge 11a, 11b or 11c connected between either or both of the routers 10a and 10b and a plurality of unshown host apparatus.

As illustrated by FIG. 3, the bridge 9a, 9b or 9c or 11a, 11b or 11c sometimes comprises a multiport bridge 7 having a multiplicity of ports "a" to "d" each adapted for receiving a formatted packet such as e.g. a packet "e" of FIG. 4.

The packet "e" has a media access control (hereafter "MAC") header e1, which is followed by an internet protocol (hereafter "IP") datagram e5, as an upper protocol is IP.

The MAC header e1 includes a combination of a destination MAC address e2 that is a MAC address of a host apparatus as a destination and a source MAC address e3 that is a MAC address of a host apparatus as a source.

In the case of an Ethernet LAN, the combination of destination and source MAC addresses e2 and e3 is followed by a type field e4 for indicating a type of the upper protocol.

In response to the source MAC address e3 of a packet "e" received at any of the ports "a" to "d", the multiport bridge 7 learns that a host apparatus corresponding to the address e3 is connected to the port receiving the packet "e".

The receiving port is now exemplarily assumed to be "a". The multiport bridge 7 then so works that upon a subsequent reception of a packet destined for the corresponding host apparatus, as it is received at any of other ports than the port "a", this received packet is always sent to the port "a", never to the other ports "b" to "d". However, if the reception occurs at the port "a", the received packet will not be sent to any of the ports "a" to "d".

In case the multiport bridge 7 has not learned which port thereof is connected to a host apparatus corresponding to the destination MAC address e2 of a received packet "e", then this packet is sent to all the ports "a" to "d".

As used herein, "to switch" means selecting a port for a packet to be sent to based on a learned relationship between a MAC address and a port. Associated actions of a learning bridge are defined in the standard IEEE (Institute of Electrical and Electronics Engineers) 802.1d.

The router has for respective ports a set of an IP address and a MAC address. Outgoing communications from any subnet are sent to a router, i.e. with the MAC address of the router as its destination MAC address, so that the router executes a necessary routing for a transmission to the next hop.

The foregoing actions of the multiport bridge are at its ports belonging to a single LAN.

In addition, there has been proposed an Ether switch in which by a grouping at each port a multiport bridge has its ports belong to different LANs so that MAC broadcasted packets are processed in subnet LANs called "virtual LANs".

However, the conventional inter-LAN connecting device needs a physical router interface for each subnet LAN so that the number of routers or router interfaces increases as the number of virtual LANs increases.

The present invention has been achieved with such points in mind.

SUMMARY OF THE INVENTION

It therefore is an object of the present invention to provide an inter-LAN connecting device free of the aforementioned problems in the prior art, permitting a network extension to be readily achieved without increasing the number of physical router interfaces.

In accordance with one aspect of the present invention, there is provided an inter-LAN connecting device, comprising: a plurality of physical Ethernet ports connected to respective host apparatus; a plurality of logic ports corresponding to the physical Ethernet ports; switch means for grouping the physical Ethernet ports and the logic ports to control communication at least within groups; a plurality of logic interfaces predetermined for each group; router means for implementing a routing among the logic interfaces as transmit-receive interfaces; and means for either inputting or outputting input-output packets from the logic ports corresponding to the logic interfaces.

Preferably, the logic interface includes means for storing the input-output packets to be communicated between the switch means and the router means.

The switch means can include a learning means for learning combinations between destination information of the input-output packets and the physical Ethernet ports by transmitting the input-output packets to the physical Ethernet ports.

The router section and the switch section are integrated and these two parts are coupled by the memories (the buffers for the switch-router communication). Hence, the addition of a new network can be readily performed without adding any new router or increasing the number of the interfaces of the router.

Further, the interfaces of the router are used as the memory interfaces, and the routing at a higher speed than a conventional system can be carried out. Moreover, it is unnecessary to use physical interfaces of the router and thus an inter-LAN connecting device can be implemented inexpensively.

BRIEF DESCRIPTION OF THE DRAWINGS

The objects, features and advantages of the present invention will become more apparent from the consideration of the following detailed description, taken in conjunction with the accompanying drawings, in which:

FIG. 11 is a flowchart showing an operation of a CPU of a router shown in FIG. 9.

DESCRIPTION OF THE PREFERRED EMBODIMENTS

The present invention will now be described in connection with its preferred embodiment with reference to the accompanying drawings.

Figure 1:
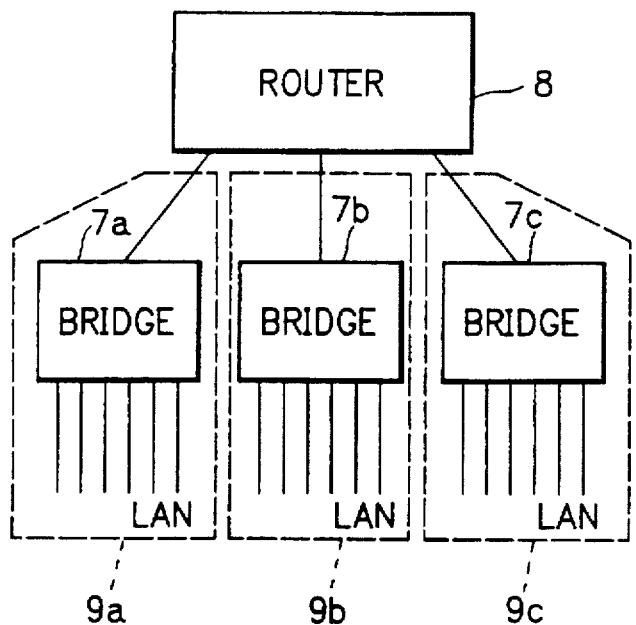
FIG. 1 is a block diagram of a conventional inter-LAN connecting device.
Figure 2:
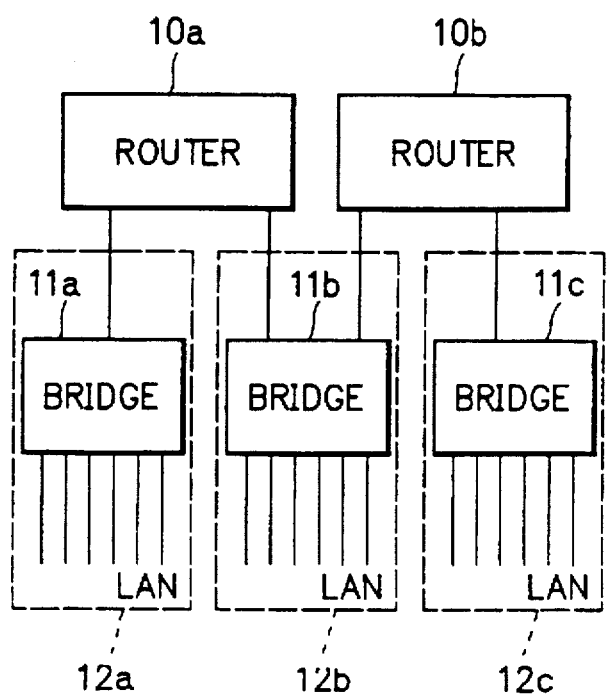
FIG. 2 is a block diagram of another conventional inter-LAN connecting device.
Figure 3:
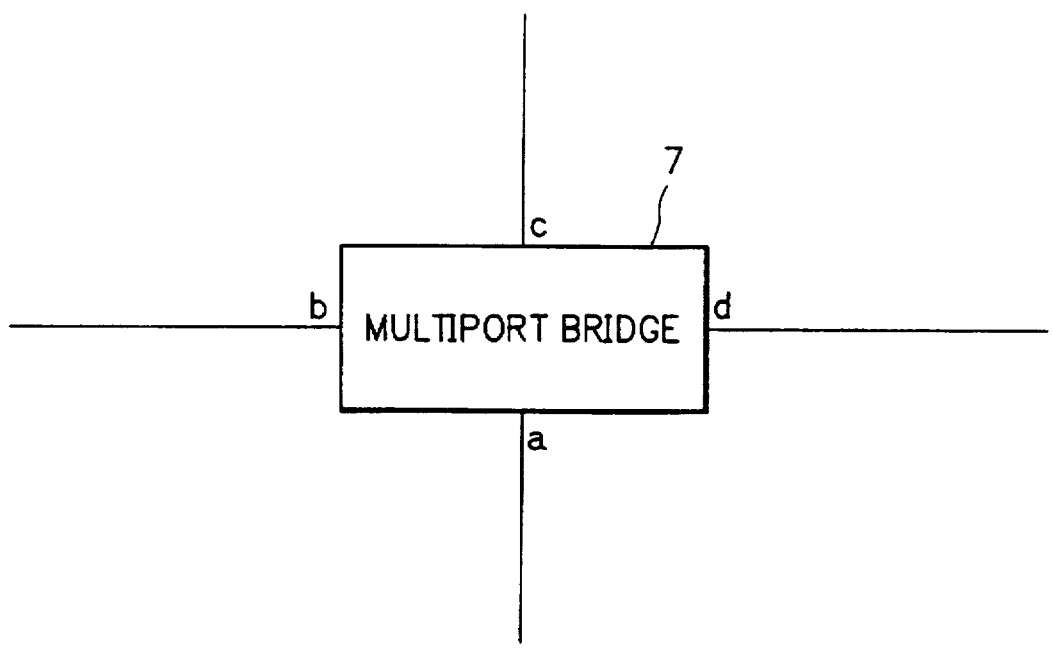
FIG. 3 is a schematic diagram showing a conventional multiport bridge.
Figure 4:
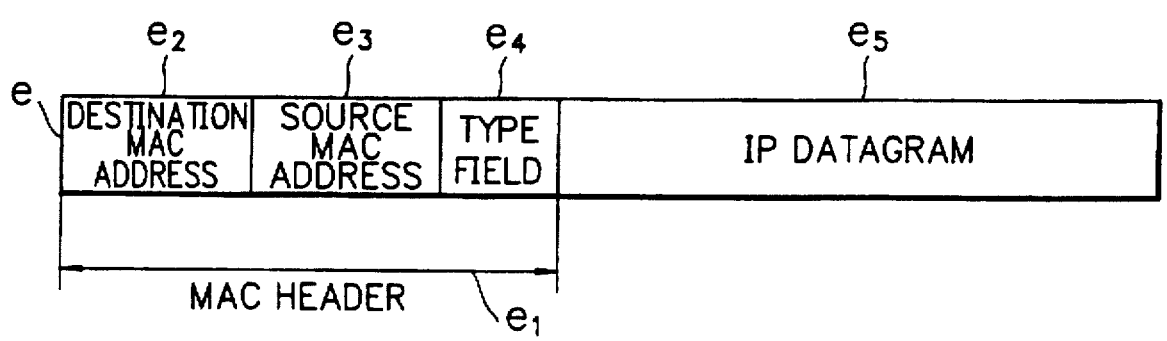
FIG. 4 is a schematic diagram showing a format of a packet.
Figure 5:
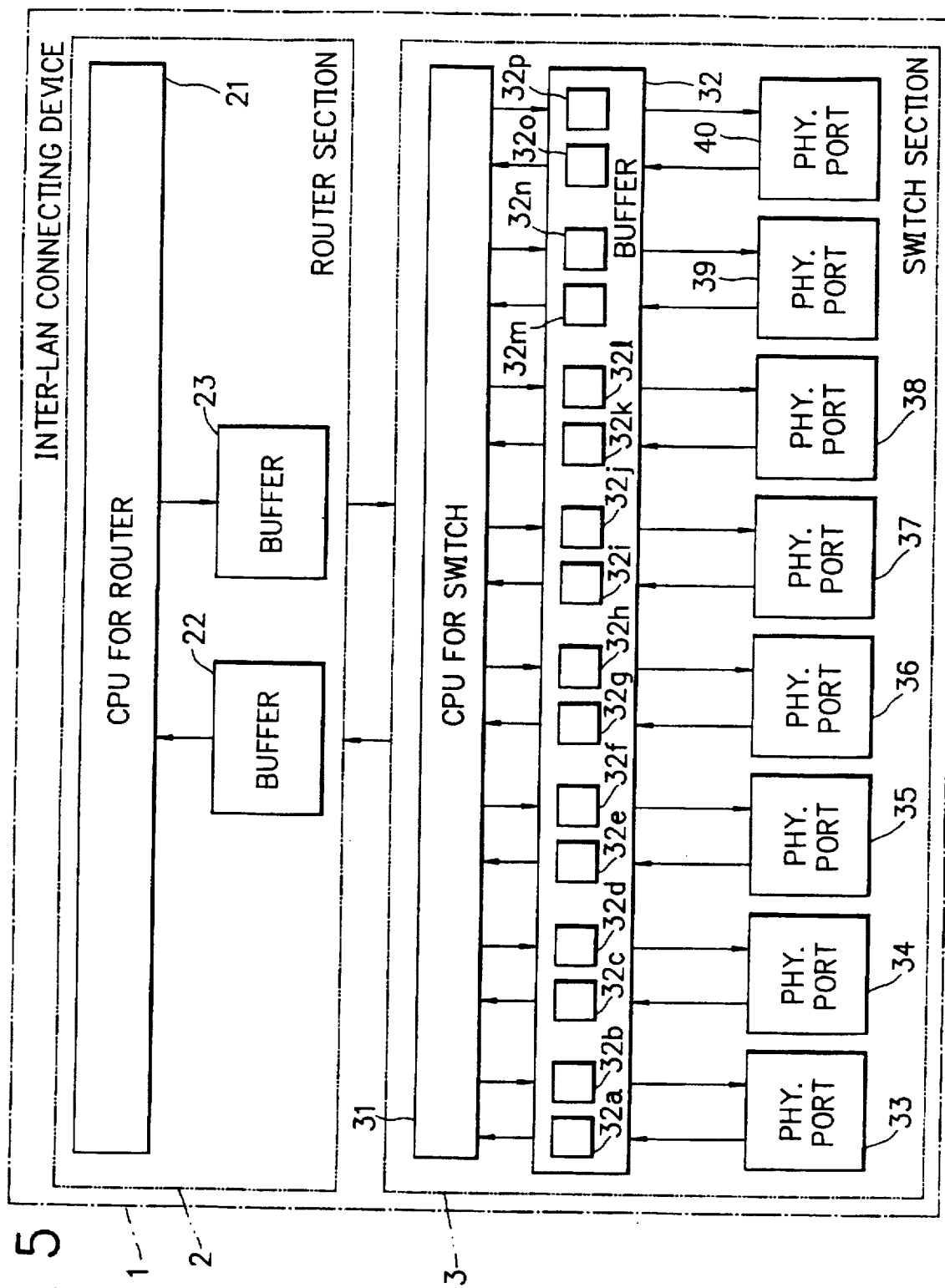
FIG. 5 is a block diagram of an inter-LAN connecting device according to one embodiment of the present invention.
Figure 6:
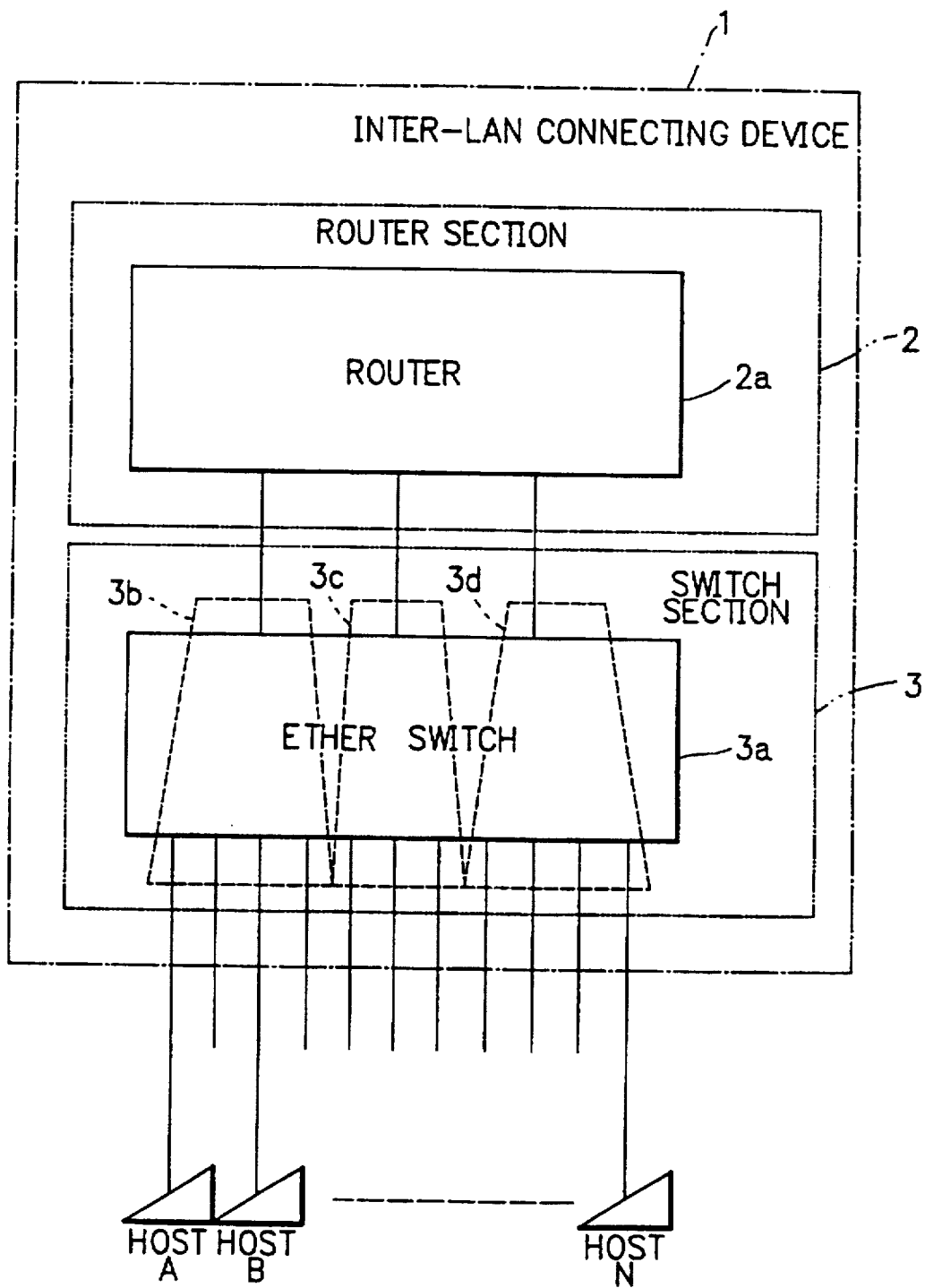
FIG. 6 is a block diagram showing a system configuration of an inter-LAN connecting device according to one embodiment of the present invention.

FIG. 5 shows an inter-LAN connecting device according to one embodiment of the present invention and FIG. 6 shows a system configuration of an inter-LAN connecting device according to one embodiment of the present invention.

In FIGS. 5 and 6, a connecting device 1 between LANs comprises a router section 2 and a switch section 3. The router section 2 includes a CPU (central processing unit) 21 for a router and buffers 22 and 23 for switch-router communication. The CPU 21 for the router and the buffers 22 and 23 for the switch-router communication constitute a router 2a. In this case, the buffers 22 and 23 for the switch-router communication are grasped as logic interfaces by the CPU 21 for the router and as logic ports by a CPU 31 for a switch.

The switch section 3 includes the CPU 31 for the switch, physical ports 33 to 40 and a transmit-receive buffer 32 for the physical ports 33 to 40, and the CPU 31 for the switch, the physical ports 33 to 40 and the transmit-receive buffer 32 for the physical ports 33 to 40 constitute an Ether switch 3a.

A plurality of hosts A to N are connected to the Ether switch 3a and the physical ports 33 to 40 and the logic ports are divided into groups to make virtual LANs 3b to 3d. Further, receive buffers 32a, 32c, 32e, 32g, 32i, 32k, 32m and 32o and transmit buffers 32b, 32d, 32f, 32h, 32j, 32l, 32n and 32p within the transmit-receive buffer 32 for the physical ports correspond to the physical ports 33 to 40, respectively.

The CPU 31 for the switch has a function to switch the packets written from the physical ports 33 to 40 into the receive buffers 32a, 32c, 32e, 32g, 32i, 32k, 32m and 32o by the MAC address on the basis of the receive port to write the packets into the transmit buffers 32b, 32d, 32f, 32h, 32j, 32l, 32n and 32p.

Next, an operation of the foregoing inter-LAN connecting device according to one embodiment of the present invention will now be described with reference to FIGS. 5 and 6. In this case, the physical ports 33 to 35 are grouped into the same virtual LAN 3b and the physical port 40 is grouped into another virtual LAN 3d.

When the host A having a MAC address "MAC-A", connected to the physical port 33 transmits a packet to the host B having a MAC address "MAC-B", connected to the physical port 34 (communication within the virtual LAN 3b), the packet whose destination MAC address is the host B is received at the physical port 33 and is written into the receive buffer 32a within the transmit-receive buffer 32 for the physical ports.

When the packet whose destination MAC address is the host B is written in the receive buffer 32a, since the received packet has a source MAC address "MAC-A", the CPU 31 for the switch learns that the host A having the MAC address "MAC-A" is connected to the physical port 33.

At this time, if the CPU 31 for the switch has already learned that the host B having the MAC address "MAC-B" is coupled with the physical port 34, the CPU 31 for the switch writes the packet written in the receive buffer 32a into the transmit buffer 32d and transmits the packet from the physical port 34 to the host B.

On the other hand, if the CPU 31 for the switch has not learned yet that the host B having the MAC address "MAC-B" is connected to the physical port 34, the CPU 31 for the switch transmits the packet written in the receive buffer 32a to all the physical ports 34 and 35 grouped with the physical port 33 in the same virtual LAN 3b.

Next, when the host A is connected to the physical port 40 and transmits a packet to the host N having a MAC address "MAC-N" and belonging to another virtual LAN 3d, since the subnet address of the destination host N is different from that of its own, the host A transmits the packet using a MAC address "MAC-R1" of the router 2a corresponding to the logic port grouped in the same virtual LAN 3b including the physical port 33 as a destination MAC address.

In the same manner as the communication within the virtual LAN 3b, learning from the received packet written in the receive buffer 32a, the CPU 31 for the switch adds the virtual LAN number to the received packet, and writes the packet into the buffer 22 for the switch-router communication to switch the packet to the logic port.

The CPU 21 for the router monitors the buffer 22 for the switch-router communication, and, when the received packet is written into the buffer 22 for the switch-router communication, the CPU 21 for the router identifies a receive logic interface from the virtual LAN number which has been added to the received packet and has been written in the buffer 22 for the switch-router communication.

The CPU 21 for the router routes an IP address of the host N as a destination IP address, treats the MAC address corresponding to the logic interface of the router 2a grouped with the physical port 40 in the same virtual LAN 3d as the source MAC address, considers the destination MAC address as the MAC address "MAC-N" of the host N, and transmits the packet, that is, writes the packet with the virtual LAN number into the buffer 23 for the switch-router communication.

After learning from the source MAC address, the CPU 31 for the switch writes the packet written in the buffer 23 for the switch-router communication into the transmit buffer 32p and transmits the packet from the physical port 40 to the host N in the same manner as the communication within the virtual LAN.

A conventional router uses physical interfaces for connecting to an Ether switch or bridges and thus addition of a subnet invites addition of a physical interface. On the other hand, in the inter-LAN connecting device according to one embodiment of the present invention, the router 2 uses logic interfaces for connecting to the switch section 3 and hence a subnet can be readily supplemented in a software manner.

Figure 7:
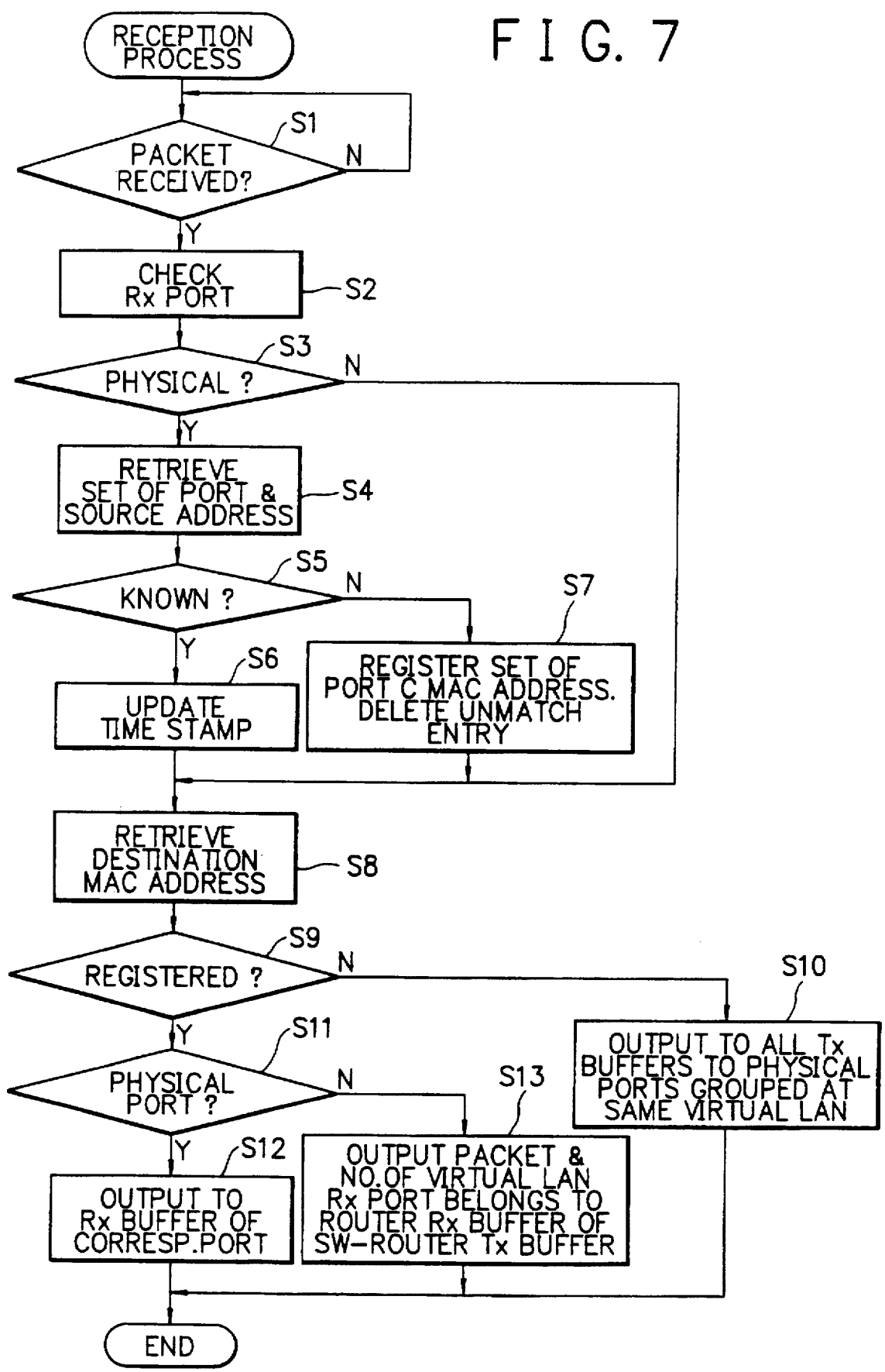
FIG. 7 is a flowchart showing an operation of a CPU of a switch shown in FIG. 5.

Next, an operation of the CPU 31 for the switch shown in FIG. 5 will be described in connection with FIGS. 5 to 7. FIG. 7 is a flowchart showing an operation of the CPU 31 for the switch.

In the CPU 31 for the switch, a learning table (not shown) showing combinations between the MAC addresses and the physical ports 33 to 40 coupled with the hosts A to N having the respective MAC addresses is arranged, and in the learning table, the times (time stamps) when these combinations have been learned are recorded corresponding to the combinations.

In the learning table, when its time exceeds a predetermined time of period, the corresponding combination is deleted. In addition, within the learning table, combinations between the logic MAC addresses of the CPU 21 for the router and the corresponding logic ports are firstly determined.

A receive processing of the CPU 31 for the switch is triggered when a packet is written into the receive buffers 32a, 32c, 32e, 32g, 32i, 32k, 32m and 32o corresponding to the physical ports 33 to 40, or a packet and a number of a virtual LAN where a logic interface of the CPU 21 for the router, transmitting this packet, belongs to are written into the buffer 23 for the switch-router communication.

In FIG. 7, when the CPU 31 for the switch judges a packet receive in step S1, a receive port is checked in step S2. When the CPU 31 for the switch determines that the receive port is the physical ports 33 to 40 in step S3, the CPU 31 for the switch retrieves the combinations of the source MAC addresses of the packets and the physical ports 33 to 40 from the learning table in step S4.

When the combinations between the source MAC addresses of the retrieved receive packets and the physical ports 33 to 40 are already registered in the learning table in step S5, the CPU 31 for the switch updates the time stamps in step S6.

Moreover, if the combinations between the source MAC addresses of the retrieved receive packets and the physical ports 33 to 40 are not registered in the learning table in step S5, the combinations between the source MAC addresses of these receive packets and the physical ports 33 to 40 are newly registered in the learning table in step S7. In this case, if the source MAC address of the receive packet registered in the learning table is combined with a different port, the CPU 31 for the switch deletes this combination from the learning table and registers a new combination in the learning table.

When the receive port is not a physical port, that is, the receive port is a logic port, or the update of the time stamps or a new registration into the learning table is completed, the CPU 31 for the switch retrieves the source MAC address of the receive packet from the learning table in step S8.

If the source MAC address of the receive packet is not registered in the learning table in step S9, the CPU 31 for the switch outputs and writes the receive packet into all the transmit buffers 32b, 32d, 32f, 32h, 32j, 32l, 32n and 32p corresponding to the physical ports 33 to 40 grouped in the same virtual LANs 3b to 3d including the physical ports 33 to 40 which have received the packet in step S10.

For example, assuming that the packet is received at the physical port 33, the CPU 31 for the switch outputs and writes the receive packet into all the transmit buffers 32d and 32f corresponding to the physical ports 34 and 35 grouped with the physical port 33 in the same virtual LAN 3b.

Further, the source MAC address of the receive packet is registered in the learning table in step S9 and the destination MAC address of the receive packet is the physical ports 33 to 40 grouped in the same virtual LANs 3b to 3d including the physical ports 33 to 40 which receives the packet in step S11, the CPU 31 for the switch outputs and writes the receive packet into the transmit buffers 32b, 32d, 32f, 32h, 32j, 32l, 32n and 32p corresponding to the physical ports 33 to 40 in step S12.

Moreover, if the source MAC address of the receive packet is registered in the learning table in step S9 and the source MAC address of the receive packet is not a physical port, that is, the source MAC address is a logic port in step S11, the CPU 31 for the switch outputs and writes the receive packet and the number of the virtual LAN that its logic port belongs to into the buffer 22 for the switch-router communication (the router communication) in step S13.

Figure 8:
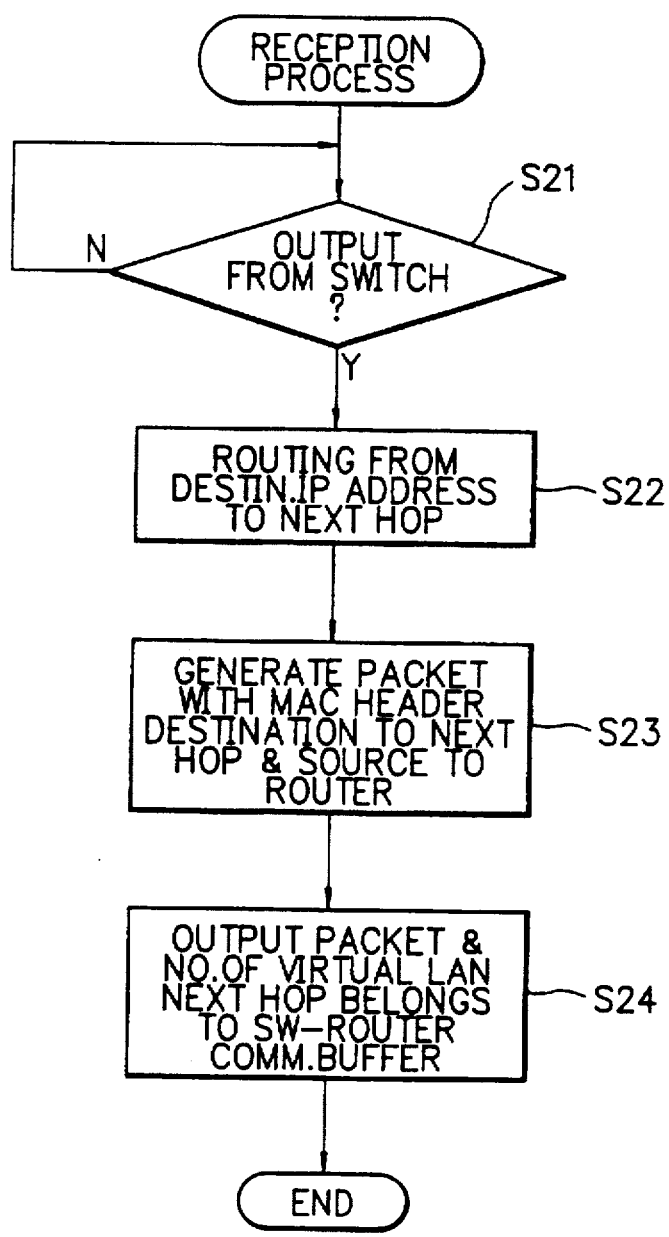
FIG. 8 is a flowchart showing an operation of a CPU of a router shown in FIG. 5.

Next, an operation of the CPU 21 for the router shown in FIG. 5 will be described in connection with FIGS. 5 to 6 and FIG. 8. FIG. 8 is a flowchart showing an operation of the CPU 21 for the router.

The receive processing of the CPU 21 for the router is triggered when a receive packet and a number of the virtual LAN that its logic port belongs to are written from the switch section 3 into the buffer 22 for the switch-router communication.

In FIG. 8, when an output from the switch section 3 is input and a receive packet and a number of the virtual LAN that its logic port belongs to are written from the switch section 3 into the buffer 22 for the switch-router communication in step S21, the CPU 21 for the router determines a logic interface of the router 2a from the virtual LAN number and receives its packet.

Thereafter, the CPU 21 for the router operates in the same manner as a usual router to conduct a routing from a destination IP address to a next hop in step S22. In other words, the CPU 21 for the router routes the destination IP address to determine the next hop and solves the MAC address of the next hop as well.

Then, the CPU 21 for the router determines the next hop as the destination of the MAC header and the router 2a as the source to produce the packet in step S23. That is, the CPU 21 for the router determines the MAC address of the next hop as the destination MAC address and the source MAC address as the logic interface to produce the packet having the MAC header.

After producing the packet, the CPU 21 for the router outputs and writes the number of the virtual LAN that the next hop belongs to and the transmit packet into the buffer 23 for the switch-router communication (the router communication) in step S24.

As described above, different from the conventional router wherein the physical interfaces are used for connecting to the Ether switch or the bridges and thus the addition of the subnet invites the addition of the physical interface of the router, in this embodiment, in the router section 2, the logic interfaces are used for connecting to the switch section 3 and hence the subnet can be readily added in the software manner.

Figure 9:
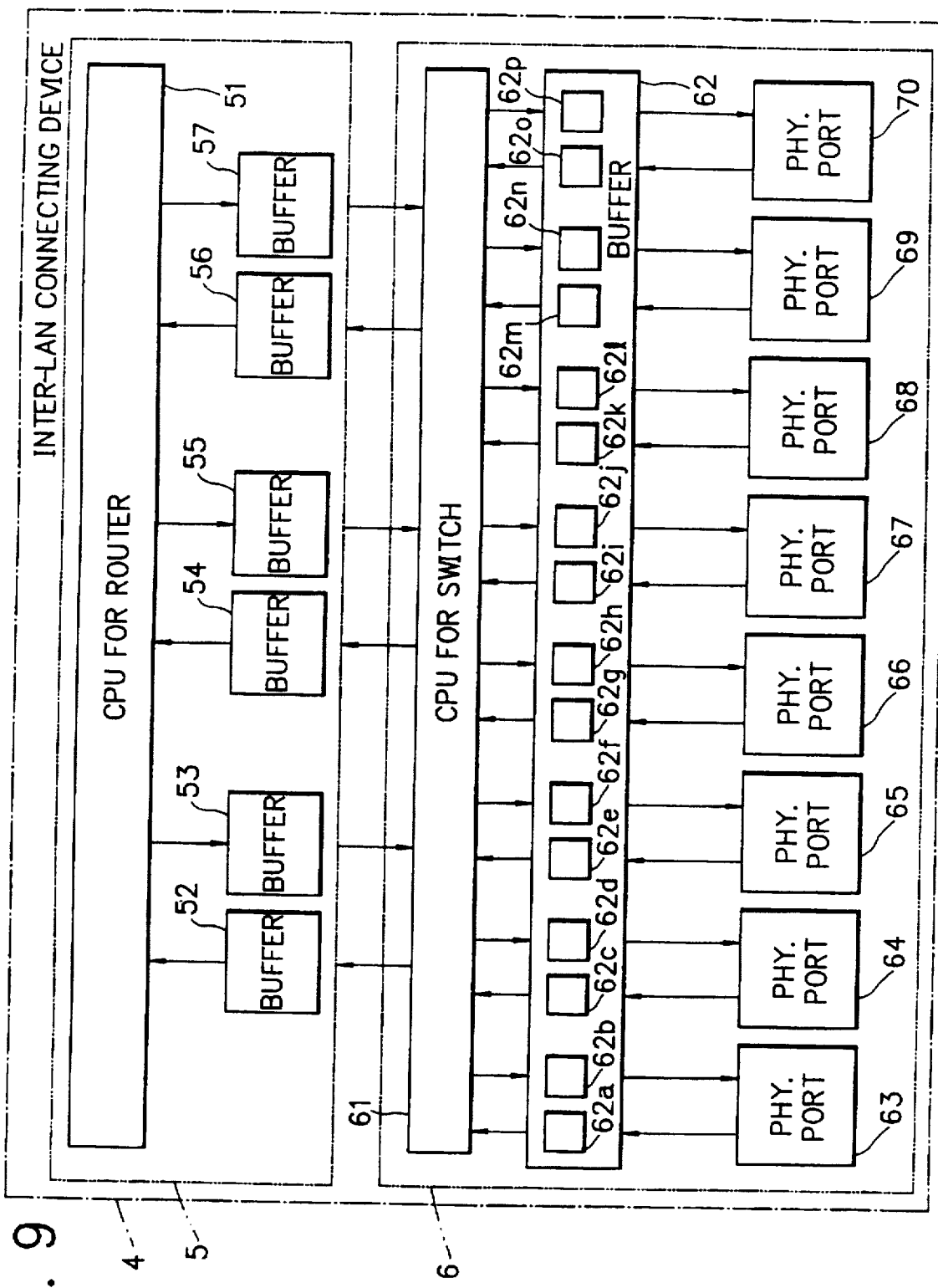
FIG. 9 is a block diagram of an inter-LAN connecting device according to another embodiment of the present invention.

FIG. 9 shows an inter-LAN connecting device according to another embodiment of the present invention.

In this embodiment, a connecting device 4 between LANs comprises a router section 5 and a switch section 6. The router section 5 includes a CPU 51 for a router and buffers 52 to 57 for switch-router communication. The switch section 6 includes a CPU 61 for the switch, physical ports 63 to 70 and a transmit-receive buffer 62 for the physical ports 63 to 70. The transmit-receive buffer 62 includes receive buffers 62a, 62c, 62e, 62g, 62i, 62k, 62m and 62o and transmit buffers 62b, 62d, 62f, 62h, 62j, 62l, 62n and 62p.

In this embodiment, in the router section 5, the buffers 52 to 57 for the switch-router communication are arranged for all logic ports so that the CPU 52 for the router and the CPU 61 for the switch may not be required for identifying the transmit or receive packets by virtual LAN numbers and hence conventional switch modules can be used without adding any particular modification.

Next, an operation of the foregoing inter-LAN connecting device according to another embodiment of the present invention will now be described with reference to FIG. 9. In this case, the physical ports 63 to 65 are grouped into one virtual LAN and the physical port 70 is grouped into another virtual LAN.

When a packet is received at a port belonging to one virtual LAN and is then written into the receive buffers 62a, 62c, 62e, 62g, 62i, 62k, 62m and 62o within the transmit-receive buffer 62 for the physical ports corresponding to the receiving port, the CPU 61 for the switch is properly switched within the virtual LAN of the receive port by the source MAC address of the receive packet.

The communication within the virtual LAN is carried out by this switching. In the communication outside the virtual LAN, the destination MAC address is directed to the MAC address of the router 5, resulting in switching to the logic port. That is, the CPU 61 for the switch writes the receive packets into only the buffers 52, 54 and 56 for the switch-router communication (the router communication) corresponding to the virtual LAN number, selected from the buffers 52 to 57 for the switch-router communication. The CPU 51 for the router identifies receive logic interfaces in the buffers 52, 54 and 56 for the switch-router communication by the destination MAC address to receive the packets.

The CPU 51 for the router carries out a proper routing and transmits the MAC address of the next hop as the destination MAC address, that is, writes the packets into the buffers 53, 55 and 57 for the switch-router communication corresponding to the transmit interfaces. The CPU 61 for the switch suitably switches the packets at the buffers 53, 55 and 57 for the switch-router communication using the MAC address.

Figure 10:
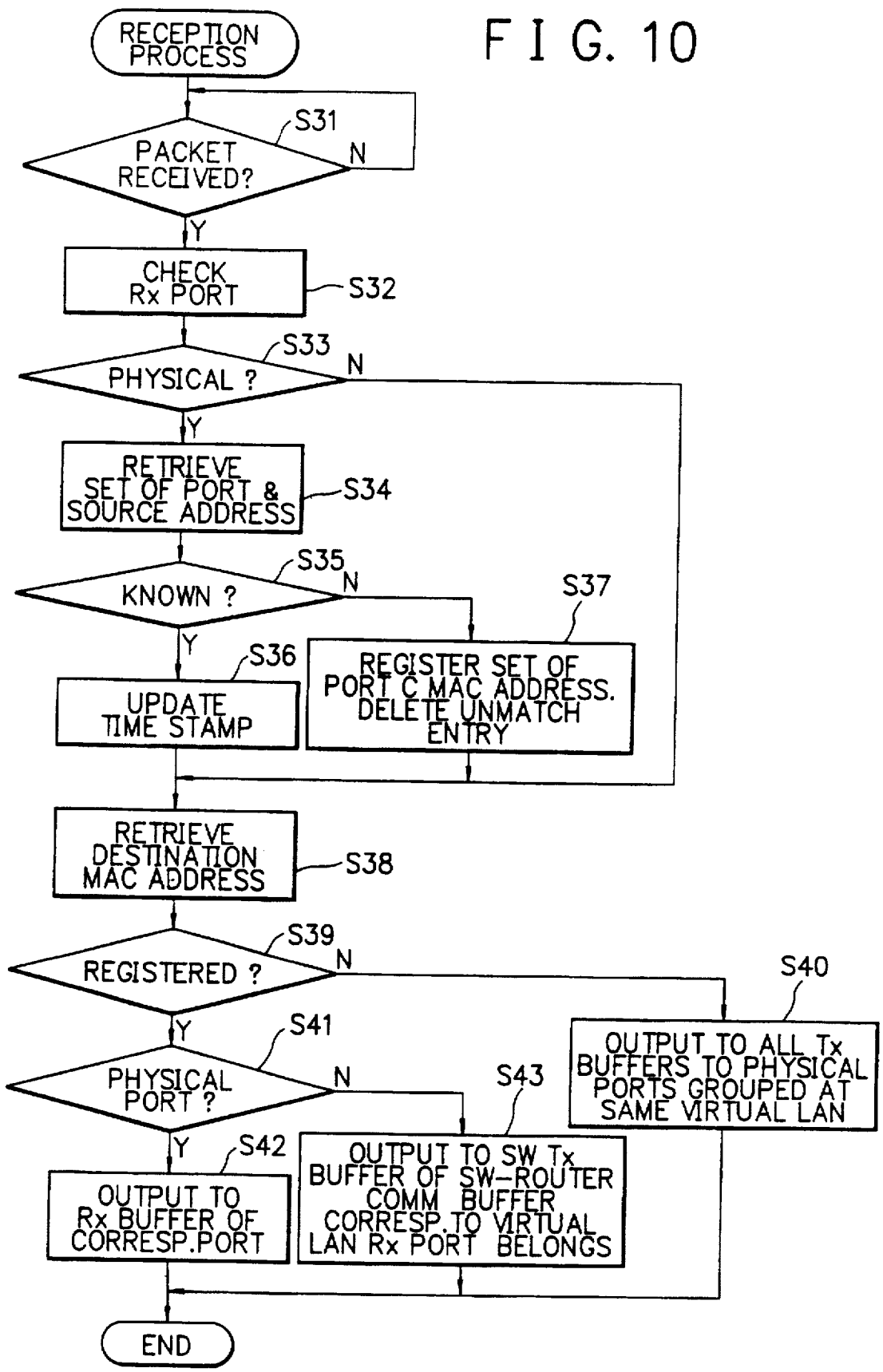
FIG. 10 is a flowchart showing an operation of a CPU of a switch shown in FIG. 9.

Next, an operation of the CPU 61 for the switch shown in FIG. 9 will be described in connection with FIGS. 9 and 10. FIG. 10 is a flowchart showing an operation of the CPU 61 for the switch.

In the CPU 61 for the switch, a learning table (not shown) showing combinations between the MAC addresses and the physical ports 63 to 70 coupled with the hosts A to N having the respective MAC addresses is arranged, and in the learning table, the times (time stamps) when these combinations have been learned are recorded corresponding to the combinations.

In the learning table, when its time exceeds a predetermined time of period, the corresponding combination is deleted. Further, within the learning table, combinations between the logic MAC addresses of the CPU 51 for the router and the corresponding logic ports are firstly determined.

A receive processing of the CPU 61 for the switch is triggered when a packet is written into the receive buffers 62a, 62c, 62e, 62g, 62i, 62k, 62m and 62o corresponding to the physical ports 63 to 70, or the packet is written into the buffers 53, 55 and 57 for the switch-router communication (the router communication).

In FIG. 10, first, when the CPU 61 for the switch judges a packet receive in step S61, a receive port is checked in step S32. When the CPU 61 for the switch determines that the receive port is the physical ports 63 to 70 in step S33, the CPU 61 for the switch retrieves the combinations of the source MAC addresses of the receive packets and the physical ports 63 to 70 from the learning table in step S34.

When the combinations between the source MAC addresses of the retrieved receive packets and the physical ports 63 to 70 are already registered in the learning table in step S35, the CPU 61 for the switch updates the time stamps in step S36.

Moreover, if the combinations between the source MAC addresses of the retrieved receive packets and the physical ports 63 to 70 are not registered in the learning table in step S35, the combinations between the source MAC addresses of these receive packets and the physical ports 63 to 70 are newly registered in the learning table in step S37. In this case, if the source MAC address of the receive packet registered in the learning table is combined with a different port, the CPU 61 for the switch deletes this combination from the learning table and registers a new combination in the learning table.

When the receive port is not a physical port, that is, the receive port is a logic port, or the update of the time stamps or a new registration into the learning table is completed, the CPU 61 for the switch retrieves the source MAC address of the receive packet from the learning table in step S38.

If the source MAC address of the receive packet is not registered in the learning table in step S39, the CPU 61 for the switch outputs and writes the receive packet into all the transmit buffers 62b, 62d, 62f, 62h, 62j, 62l, 62n and 62p corresponding to the physical ports 63 to 70 grouped in the same virtual LANs including the physical ports 63 to 70 which have received the packet in step S40.

For example, assuming that the packet is received at the physical port 63, the CPU 61 for the switch outputs and writes the receive packet into all the transmit buffers 62d and 62f corresponding to the physical ports 64 and 65 grouped with the physical port 63 in the same virtual LAN.

Further, the source MAC address of the receive packet is registered in the learning table in step S39 and the destination MAC address of the receive packet is the physical ports 63 to 70 grouped in the same virtual LANs including the physical ports 63 to 70 which receives the packet in step S41, the CPU 61 for the switch outputs and writes the receive packet into the transmit buffers 62b, 62d, 62f, 62h, 62j, 62l, 62n and 62p corresponding to the physical ports 63 to 70 in step S42.

Moreover, the source MAC address of the receive packet is registered in the learning table in step S39 and the source MAC address of the receive packet is not a physical port, that is, the source MAC address is a logic port in step S41, the CPU 61 for the switch outputs and writes the receive packet and the number of the virtual LAN that its logic port belongs to into the buffers 52, 54 and 56 for the switch-router communication (the router communication) in step S43.

Next, an operation of the CPU 51 for the router shown in FIG. 9 will be described in connection with FIGS. 9 and 11. FIG. 11 is a flowchart showing an operation of the CPU 51 for the router.

The receive processing of the CPU 51 for the router is triggered when a receive packet is written from the switch section 6 into the buffers 52, 54 and 56 for the switch-router communication.

In FIG. 11, when an output from the switch section 6 is input and a receive packet is written from the switch section 6 into the buffers 52, 54 and 56 for the switch-router communication in step S51, the CPU 51 for the router receives the packet.

Thereafter, the CPU 51 for the router operates in the same manner as a usual router to conduct a routing from a destination IP address to a next hop in step S52. In other words, the CPU 51 for the router executes a routing of the destination IP address to determine the next hop and solves the MAC address of the next hop as well.

Then, the CPU 51 for the router determines the next hop as the destination of the MAC header and the router section 5 as the source to produce the packet in step S53. That is, the CPU 51 for the router determines the MAC address of the next hop as the destination MAC address and the source MAC address as the logic interface to produce the packet having the MAC header.

After producing the packet, the CPU 51 for the router outputs and writes a transmit packet into the buffers 53, 55 and 57 for the switch-router communication (the router communication) corresponding to the virtual LAN that the next hop belongs to in step S54.

As described above, in this embodiment, the subnet can be readily added in the software manner by using the logic interfaces, and further by arranging the buffer 52, 53, 54, 55, 56 or 57 for the switch-router communication for each logic port within the router 5, the CPU 51 for the router and the CPU 61 for the switch are not required for identifying the transmit or receive packet by the virtual LAN number. As a result, conventional switch modules can be used without adding any particular modification.

As described above, according to the present invention, the router section 2 or 5 and the switch section 3 or 6 are integrated and these two parts are coupled by the memories (the buffers 22, 23 and 52 to 57 for the switch-router communication). Hence, the addition of a new network can be readily performed without adding any new router or increasing the number of the interfaces of the router.

Further, the interfaces of the router are used as the memory interfaces, and the routing at a higher speed than a conventional system can be carried out. Moreover, it is unnecessary to use physical interfaces of the router and thus an inter-LAN connecting device can be implemented inexpensively.

According to the present invention, as described above, a plurality of physical Ethernet ports connected to respective host apparatus and a plurality of logic ports corresponding to the physical Ethernet ports are divided into groups, respectively, and at least the communication within each group is controlled. A plurality of logic interfaces predetermined for each group are used as transmit-receive interfaces and a routing among the logic interfaces is implemented. Further, by inputting or outputting input or output packets from the logic ports corresponding to the logic interfaces, a new network can be readily added without physically increasing the interfaces of the router even when a new network is added.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An inter-LAN connecting device, comprising:
   a plurality of physical Ethernet ports connected to respective host apparatuses;
   a plurality of logic ports corresponding to the physical Ethernet ports;
   switch means for grouping the physical Ethernet ports and the logic ports to control communication within groups;
   router means for receiving a packet from said switch means which is addressed to a destination outside of the group which originated said received packet and for implementing a routing of packets transmitted between groups; and
   a plurality of logic interfaces predetermined for each group, said logic interfaces connected between said router means and said switch means to allow communications between different groups through said switch means and said router means, said logic interfaces being reconfigurable based on the grouping of the physical Ethernet ports by said switch.

2. An inter-LAN connecting device of claim 1, wherein the logic interface includes means for storing the packets to be communicated between the switch means and the router means.

3. An inter-LAN connecting device, comprising:
   a plurality of physical Ethernet ports connected to respective host apparatus;
   a plurality of logic ports corresponding to the physical Ethernet ports;
   switch means for grouping the physical Ethernet ports and the logic ports to control communication within groups;
   a plurality of reconfigurable logic interfaces predetermined for each group;
   router means for implementing a routing among the logic interfaces as transmit-receive interfaces between said router means and said switch means; and
   means for either inputting or outputting packets from the logic ports corresponding to the logic interfaces;
   wherein the switch means includes a learning means for learning combinations between destination information of the packets and the physical Ethernet ports by transmitting the packets to the physical Ethernet ports.

4. An inter-LAN connecting device for connection subnetworks in a network that transfers data packets, comprising:
   a plurality of physical Ethernet ports connected to respective host apparatuses;
   a plurality of logic ports corresponding to the physical Ethernet ports;
   switch means for grouping the physical Ethernet ports and the logic ports to control communication within groups;
   a plurality of reconfigurable logic interfaces predetermined for each group, said logic interfaces including means for storing the packets to be communicated between the switch means and the router means;

router means for implementing a routing among the logic interfaces as transmit-receive interfaces between said router means and said switch means; and means for either inputting or outputting packets from the logic ports corresponding to the logic interfaces wherein the switch means includes a learning means for learning combinations between destination information of the packets and the physical Ethernet ports by transmitting the packets to the physical Ethernet ports.

5. An inter-LAN connecting device for connecting multiple subnetworks in a larger network, said device comprising:

a plurality of physical LAN ports connected to respective host apparatuses;

a switch processor operable to logically group physical LAN ports as virtual LANs and control the transfer of data packets between LAN ports that are logically grouped together as a virtual LAN;

a router operable to control inter-virtual LAN transfer of data packets by receiving said inter-virtual LAN data packets from said switch processor and routing said received information to an appropriate virtual LAN through said switch processor; and a logical interface between said switch processor and said router, said interface configurable based on the grouping of LAN ports as virtual LANs.

* * * * *